(12) United States Patent
Erdman et al.

(10) Patent No.: US 8,392,323 B2
(45) Date of Patent: Mar. 5, 2013

(54) COMPUTER-IMPLEMENTED SYSTEMS AND METHODS FOR PARAMETER RISK ESTIMATION FOR OPERATIONAL RISK

(75) Inventors: Donald James Erdman, Raleigh, NC (US); Jacques Rioux, Cary, NC (US)

(73) Assignee: SAS Institute Inc., Cary, NC (US)

(*) Notice: Subject to any disclaimer, the term of this patent is extended or adjusted under 35 U.S.C. 154(b) by 287 days.

(21) Appl. No.: 12/706,498

(22) Filed: Feb. 16, 2010

(65) Prior Publication Data
US 2011/0202373 A1 Aug. 18, 2011

(51) Int. Cl.
*G06Q 40/00* (2012.01)
(52) U.S. Cl. ............. 705/38; 705/4; 705/7.11; 705/7.28
(58) Field of Classification Search ............. 705/4, 7.11, 705/7.28, 38
See application file for complete search history.

(56) References Cited

U.S. PATENT DOCUMENTS

| | | | |
|---|---|---|---|
| 7,072,841 B1* | 7/2006 | Pednault | 705/4 |
| 7,409,357 B2* | 8/2008 | Schaf et al. | 705/7.28 |
| 2003/0088510 A1 | 5/2003 | Yokota et al. | |
| 2007/0016542 A1* | 1/2007 | Rosauer et al. | 706/21 |
| 2007/0239496 A1 | 10/2007 | Supatgiat et al. | |

OTHER PUBLICATIONS

Jobst, Andreas A., "Modeling Constraints and Statistical Issues of Consistent Operational Risk Measurement", Working Paper, pp. 1-18 [Jan. 8, 2007].

Jobst, Andreas A., "Operational Risk—The Sting is Still in the Tail but the Poison Depends on the Dose", IMF Working Paper, WP/07/239, pp. 1-72 [Nov. 2007].

Panjer, Harry H., "Recursive Evaluation of a Family of Compound Distributions", Astin Bulletin 12, pp. 22-26 [1981].

Plesko, Stefan, "Operational Risk Quantification with Extreme Value Theory and Actuarial Methods", Master of Advanced Studies Thesis in Quantitative Finance and Risk Management, Department of Mathematics, Federal Institute of Technology (ETH) Zurich, pp. 1-45 [Dec. 29, 2006].

Shevchenko, Pavel V., "Estimation of Operational Risk Capital Charge under Parament Uncertainty", preprint of article published in The Journal of Operational Risk, vol. 3, No. 1, pp. 51-63 [2008].

Yashchin, E., "Modeling of risk losses using size-biased data", IBM J. Res. & Dev., vol. 51, No. 3-4 pp. 309-323 [May/Jul. 2007].

* cited by examiner

*Primary Examiner* — Jagdish Patel
*Assistant Examiner* — Sara C Hamilton
(74) *Attorney, Agent, or Firm* — Kilpatrick Townsend & Stockton LLP

(57) ABSTRACT

Systems and methods are provided for determining a loss mitigation reserve requirement based on a risk measure estimation and a confidence interval associated with the risk measure estimation. Distribution parameters of a frequency model and distribution parameters of a severity model are determined, and a covariance matrix representing the determined parameters of the distribution of the frequency model and the determined parameters of distribution of the severity model is generated. One or more analytical derivatives of a cumulative distribution function of the frequency model, one or more analytical derivatives of a cumulative distribution function of the severity model, and a parameter covariance matrix are calculated. A confidence interval is computed for the risk measure estimation based on a vector of derivatives of a cumulative distribution function.

30 Claims, 9 Drawing Sheets

US 8,392,323 B2

COMPUTER-IMPLEMENTED SYSTEMS AND METHODS FOR PARAMETER RISK ESTIMATION FOR OPERATIONAL RISK

FIELD

The technology described herein relates generally to operational risk and more specifically to estimation of parameter risk in operational risk.

BACKGROUND

A statistical model is a set of mathematical equations which describe the behavior of an object of study in terms of random variables and their associated probability distributions. For example, in order to forecast and manage business risk, a set of variables are identified that describe the state of the world and are forecasted into the future. These variables are often termed risk factors. Each risk factor has different attributes and behaviors and is a unique contributor to the entire system.

Risk management refers to the design and implementation of procedures for identifying, measuring, and managing risks. A risk manager desires to be prepared for possible deleterious movements of the risk factors. To determine possible future values, a forecast is performed. The forecast of interest may not be a single point but a distribution of possible values in the future. The distribution of risk factors may be modeled using various approaches such as: Monte Carlo simulation, historical simulation, scenario simulation, etc.

SUMMARY

In accordance with the teachings herein, systems and methods are provided for determining a loss mitigation reserve requirement based on a risk measure estimation and a confidence interval associated with the risk measure estimation. Distribution parameters of a frequency model and distribution parameters of a severity model are determined, and a covariance matrix representing the determined parameter of the distribution of the frequency model and the determined parameter of distribution of the severity model is generated. One or more analytical derivatives of the cumulative distribution function of the frequency model, the severity model, and a parameter covariance matrix are calculated. A confidence interval is computed for the risk measure estimation based on a vector of derivatives of the cumulative distribution function.

As another example, a computer-implemented system and method may determine a distribution parameter of the frequency model and a distribution parameter of the severity model and generate a covariance matrix representing the variability of the determined parameter of the distribution of the frequency model and of the determined parameter of distribution of the severity model. A system and method may further include determining one or more analytical derivatives of a cumulative distribution function of the distribution of the frequency model, the distribution of the severity model, and a parameter covariance matrix, where the determining includes calculating a partial derivative of the frequency model with respect to one of the parameters of the distribution of the frequency model, calculating a partial derivative of the cumulative distribution function with respect to one of the parameters of the distribution of the frequency model using the partial derivative of the cumulative distribution of the frequency model, and defining a vector of derivatives of the cumulative distribution function with respect to one or more parameters of the distribution of the frequency model and one or more parameters of the distribution of the severity model. A system and method may also include computing a confidence interval for the risk measure estimation based on the vector of derivatives of the cumulative distribution function and the parameter covariance matrix, summing the risk measure estimation and a one-side width of the confidence interval as the loss mitigation reserve requirement value, and storing the loss mitigation reserve requirement value in a computer-readable medium.

As another example, a computer-readable medium may be encoded with software instructions for commanding a data processor to perform steps that include determining a distribution parameter of the frequency model and a distribution parameter of the severity model and generating a covariance matrix representing the determined parameter of the distribution of the frequency model and the determined parameter of distribution of the severity model, and determining one or more analytical derivatives of a cumulative distribution function of the distribution of the frequency model, the distribution of the severity model, and a parameter covariance matrix, where the determining includes calculating a partial derivative of the frequency model with respect to one of the parameters of the distribution of the frequency model, calculating a partial derivative of the cumulative distribution function with respect to one of the parameters of the distribution of the frequency model using the partial derivative of the cumulative distribution of the frequency model, and defining a vector of derivatives of the cumulative distribution function with respect to one or more parameters of the distribution of the frequency model and one or more parameters of the distribution of the severity model. The steps may also include computing a confidence interval for the risk measure estimation based on the vector of derivatives of the cumulative distribution function and the parameter covariance matrix, summing the risk measure estimation and a one-side width of the confidence interval as the loss mitigation reserve requirement value, and storing the loss mitigation reserve requirement value in a computer-readable medium.

As a further example, a computer-implemented system may include a data processing system and a computer-readable memory coupled to the processing system. The data processing system may be configured to perform steps that include determining a distribution parameter of the frequency model and a distribution parameter of the severity model and generating a covariance matrix representing the determined parameter of the distribution of the frequency model and the determined parameter of distribution of the severity model, and determining one or more analytical derivatives of a cumulative distribution function of the distribution of the frequency model, the distribution of the severity model, and a parameter covariance matrix, where the determining includes calculating a partial derivative of the frequency model with respect to one of the parameters of the distribution of the frequency model, calculating a partial derivative of the cumulative distribution function with respect to one of the parameters of the distribution of the frequency model using the partial derivative of the cumulative distribution of the frequency model, and defining a vector of derivatives of the cumulative distribution function with respect to one or more parameters of the distribution of the frequency model and one or more parameters of the distribution of the severity model. The steps may also include computing a confidence interval for the risk measure estimation based on the vector of derivatives of the cumulative distribution function and the parameter covariance matrix, summing the risk measure estimation and a one-side width of the confidence interval as the loss mitigation reserve requirement value, and storing the loss mitigation reserve requirement value in a computer-readable medium.

DETAILED DESCRIPTION

Figure 1:
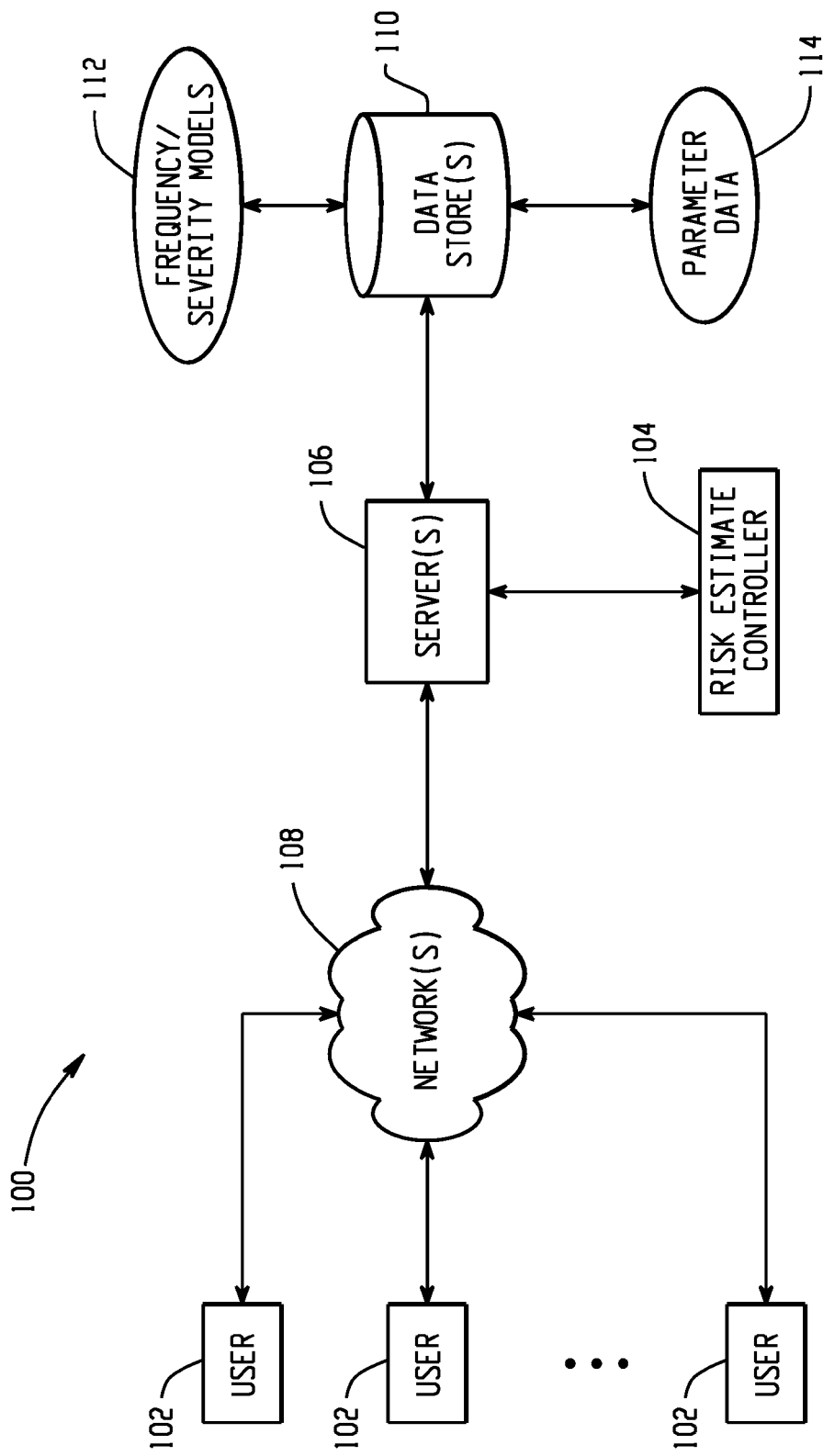
FIG. 1 depicts a computer-implemented environment wherein users can interact with a risk estimate controller hosted on one or more servers through a network.

FIG. 1 depicts at 100 a computer-implemented environment wherein users 102 can interact with a risk estimate controller 104 hosted on one or more servers 106 through a network 108. The risk estimate controller 104 may be implemented in a wide variety of contexts. For example, some organizations monitor the likelihood that they will endure losses resulting from risks associated with their operations. This monitoring may involve forecasting operational loss profiles and using those profiles to measure risk. One measure of operational risk is the 99.9% value at risk (VaR) measure of the yearly aggregate loss. The VaR number reflects the size beyond which a company could expect to see total losses once in 1000 years.

One way to forecast operational risk is to fit models to past losses and use the fitted models to predict the future. Such a method is prone to both model risk and parameter risk. Model risk addresses the possibility that the model selected to fit the data is not appropriate. Parameter risk addresses the fact that, given the correct model, the estimated parameters may be incorrect. The following discussion assumes the selection of an appropriate model and addresses parameter risk.

In some situations, parameter estimates are provided with confidence intervals to reflect uncertainty in the parameter values. Risk managers may be interested in how these parameter confidence intervals translate into confidence intervals for their aggregate risk forecasts (e.g., the VaR calculation.) Parameter risk is of interest to risk managers because risk measures may be used to determine reserves a company holds to insure against losses. These reserves may range into the 100s of millions of dollars and beyond for large companies. Large uncertainties in the estimated risk measure could result in a company holding too much or too little capital.

With reference to FIG. 1, the system 104 contains software operations or routines for determining a loss mitigation reserve requirement based on a risk measure estimation and a confidence interval associated with the risk measure estimation. The users 102 can interact with the system 104 through a number of ways, such as over one or more networks 108. One or more servers 106 accessible through the network(s) 108 can host the risk estimate controller 104. It should be understood that the risk estimate controller 104 could also be provided on a stand-alone computer for access by a user.

Figure 2:
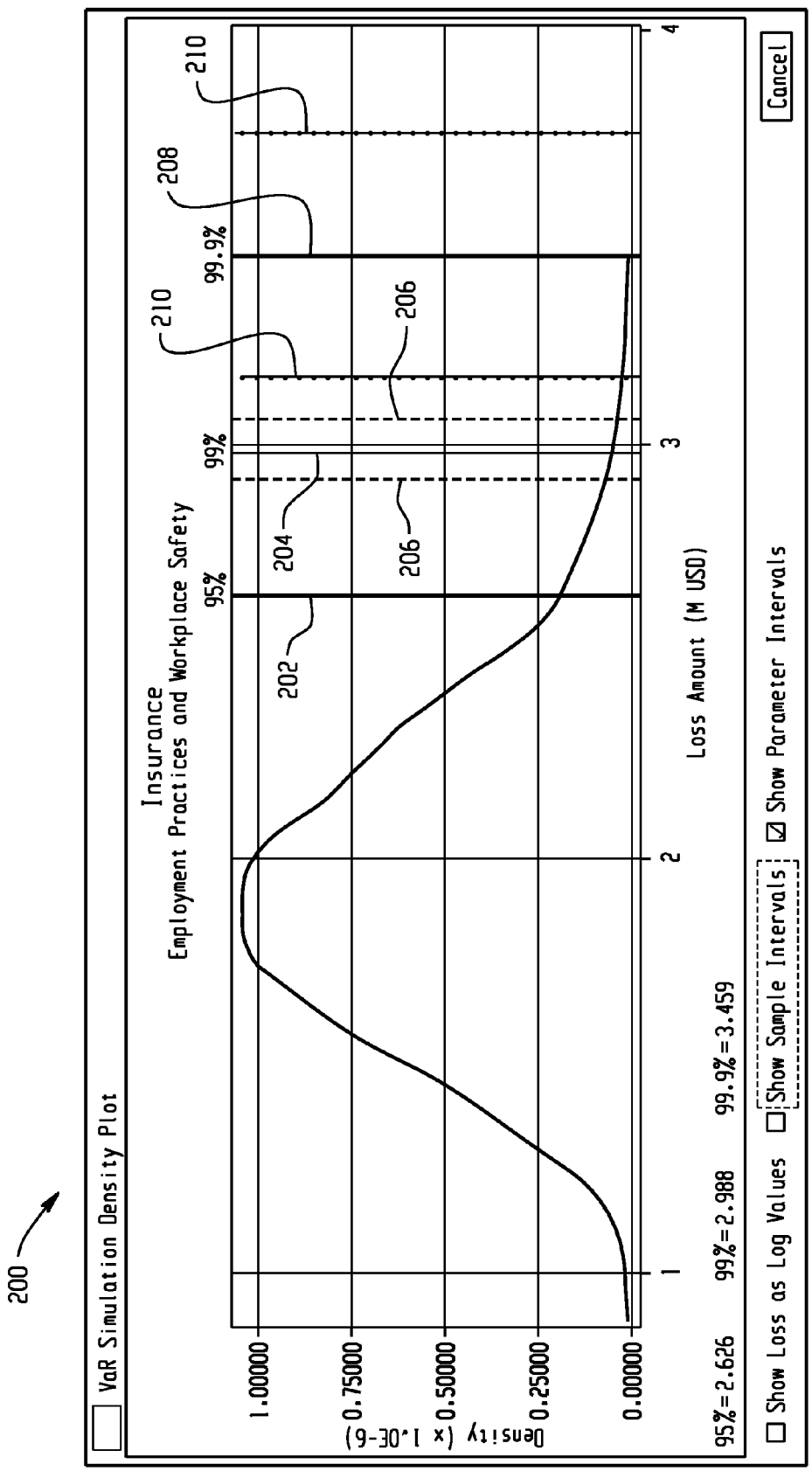
FIG. 2 depicts a forecasted loss distribution.

FIG. 2 depicts a forecasted aggregate loss distribution. Several value at risk (VaR) numbers are denoted by the vertical reference lines and confidence intervals. For example, the 95% VaR estimate and associated narrow confidence interval, shown at 202, identifies the largest single yearly loss a company may expect to experience over 20 years. The 99% VaR estimate 204 and its associated confidence interval 206, identifies the largest single yearly loss a company may expect to experience over 100 years. The 99.9% VaR estimate 208 and its associated confidence interval 210, identifies the largest single yearly loss a company may expect to experience over 1000 years.

The distribution shown is that of possible aggregate losses a company could face in the future. An aggregate loss is a random sum of a set of possible losses that could occur in a year. The magnitudes of individual loss amounts that could occur are described by a severity distribution. The number of terms in each sum is a random variable described by a frequency distribution. For example, for each of a number of aggregate loss estimations generated to form an aggregate loss distribution, a Monte Carlo simulation may select a number of losses based on the frequency distribution and a magnitude for each of those losses based on the severity distribution. The sum of these magnitudes is calculated to generate a single estimated aggregate loss value. A set of several of these forecasted aggregate losses may then be compiled to generate a forecasted aggregate loss distribution, such as the distribution shown in FIG. 2.

The width of a confidence interval about a risk measure depends in part upon the chosen frequency and severity models, variance in the data, and the number of observations utilized in configuring the selected frequency and severity models. The models chosen and the number of observations may be more under the user's control than the variance of the data. The width of the confidence interval is proportional to a function of the number of observations utilized, n, and the number of parameters in the models, p (e.g., sqrt(1/n−p)). That is, in general, as more data is collected from the same population, the smaller the confidence interval will become. Similarly, adding more parameters to a severity model could increase the confidence intervals if the parameters are not important to the model.

Institutions monitoring their operational risk may have opportunities to join consortiums to pool input data. As a first approximation, if an institution becomes the fourth member of a consortium with members having a similar number of losses, they can expect to have a confidence interval about their capital allocation number half as wide as they would computing their capital allocation using only their data. Similarly, if an institution becomes the $16^{th}$ member of a consortium, they can expect the confidence interval about their capital allocation number to be a quarter the size versus only their data.

For example, an organization may have a 99.9% VaR of $1 billion with a confidence interval of ±$400 million. To guard against business failure, the company may reserve $1.4 billion. If the organization joins a consortium with 16 members, the 99% VaR based on the consortium data remains at $1 billion, but the confidence interval is reduced to ±$100 million based on the additional data observations offered by the consortium collaboration. To guard against business failure, the organization reserves $1.1 billion. The freed $300 million invested at a 5% risk free rate would offer the company $15 million in savings.

In the loss distribution approach to loss modeling, the distributions for the severity and frequency are estimated based on available data. It is the availability and reliability of the data that introduces parameter risk into the forecasting process. The parameter risk contributes to the confidence intervals which surround each of the VaR values 202, 204, 208. The confidence interval has real-life implications for a company, because, to confidently self-insure against all but 1 in 100 year losses, the company must retain a reserve at the right edge of the confidence interval 206 around the 99% VaR value 204. Small variations in the confidence interval based on error in calculating the confidence interval could have implications in the hundreds of thousands or millions of dollars of money that could be better invested elsewhere if the confidence intervals were more accurately calculated.

With reference back to FIG. 1, the risk estimate controller 104 provides a loss mitigation reserve requirement based on a risk measure estimation and a confidence interval associated with the risk measure estimation. The risk measure estimation is calculated based on a number of predicted losses estimated by a frequency model and the amount of each predicted loss being estimated by a severity model. The one or more servers 106 are responsive to one or more data stores 110 for providing input data to the risk estimate controller 104. Among the data contained on the one or more data stores 110 there may be frequency and severity models 112 used in generating predictions as well as parameter data 114 used for configuring the frequency and severity models 112.

Figure 3:
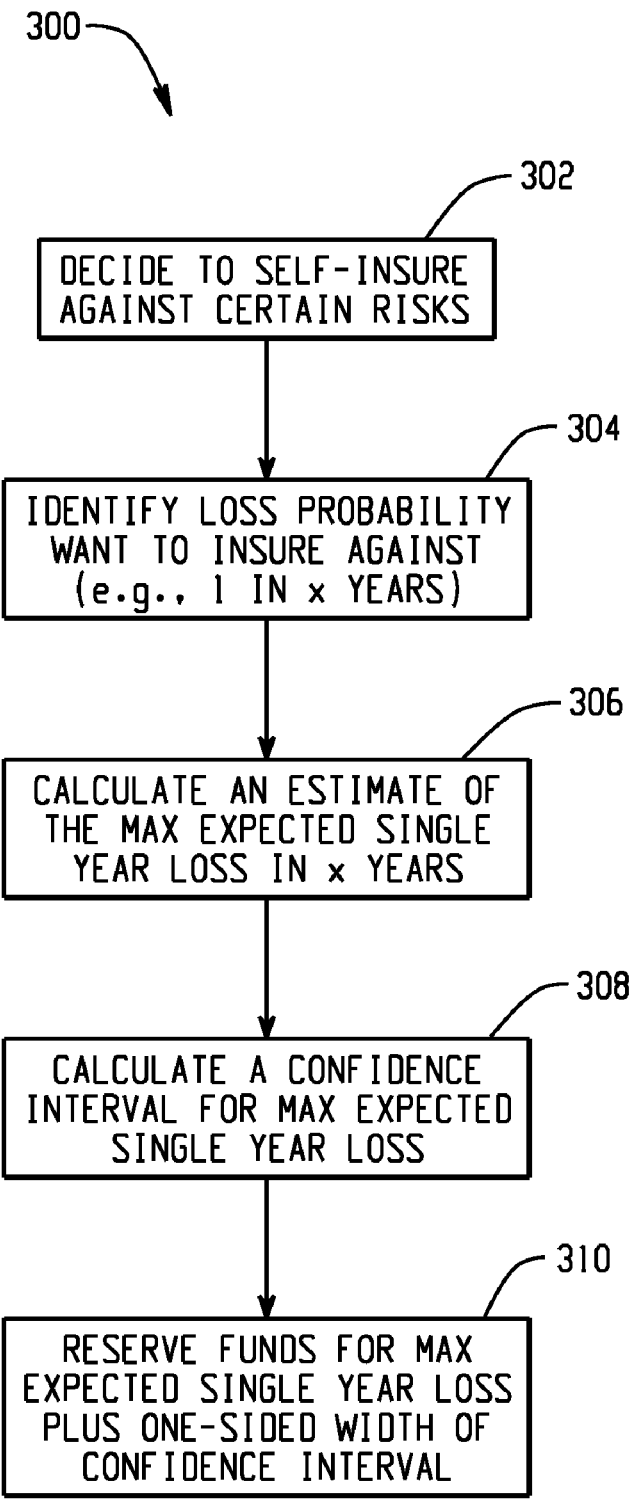
FIG. 3 is a flow diagram implementing steps in a self-insuring process that may utilize a risk estimate controller.

FIG. 3 is a flow diagram implementing steps in a self-insuring process that may utilize a risk estimate controller. At 302, a company decides to self-insure against certain risks. The company may decide to insure against all risks, a portion of all risks, certain types of risks, or a portion of certain risks. The company decides a loss probability they wish to insure against at 304. For example, a company may decide to self-insure against 1 in 20 year losses. (The company may purchase supplemental catastrophic insurance to insure against greater losses.) A calculation is made as to an estimate of the maximum expected single year loss in 20 years at 306. Based on the forecasted aggregate loss distribution of FIG. 2, the estimate of the maximum expected single year loss in 20 years is depicted at 204. A confidence interval for the maximum expected single year loss in 20 years is calculated at 308. Based on the forecasted aggregate loss distribution of FIG. 2, the confidence interval of the maximum expected single year loss in 20 years is depicted at 206. Knowing the estimate of the maximum expected single year loss in 20 years and the confidence interval of the maximum expected single year loss in 20 years, the company can reserve funds for the maximum expected single year loss plus the one-sided width of the confidence interval at 310. With reference to the distribution of FIG. 2, the company would reserve the amount of money identified at the right confidence interval 206 of loss estimate 204. Thus, the company could be 95% sure that they are insured against expected 1 in 20 year losses.

Figure 4:
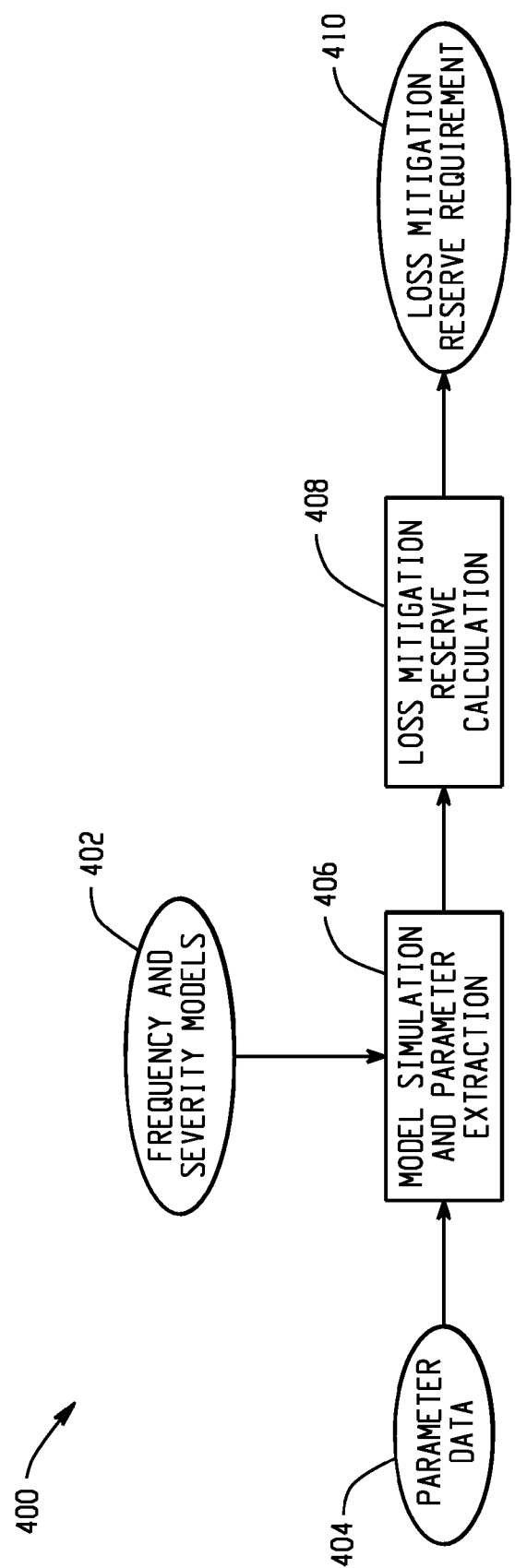
FIG. 4 is a flow diagram depicting a method for determining a loss mitigation reserve requirement based on a risk measure estimation and a confidence interval associated with the risk measure estimation.

FIG. 4 is a flow diagram depicting a method for determining a loss mitigation reserve requirement based on a risk measure estimation and a confidence interval associated with the risk measure estimation. Frequency and severity models 402 and parameter data 404 are received and a model simulation and parameter extraction are performed at 406. The model simulation may, for example, generate a forecasted loss distribution, such as the loss distribution depicted in FIG. 2, and the parameter extraction may extract data from the frequency and severity models and the estimated loss distribution that may be utilized in determining a confidence interval width. At 408, a calculation is made as to a loss mitigation reserve. The loss mitigation reserve calculation 408 calculates the confidence interval for a risk measure estimation and may add the one-side width of the confidence interval to the risk measure estimation to generate a loss mitigation reserve requirement 410.

Figure 5:
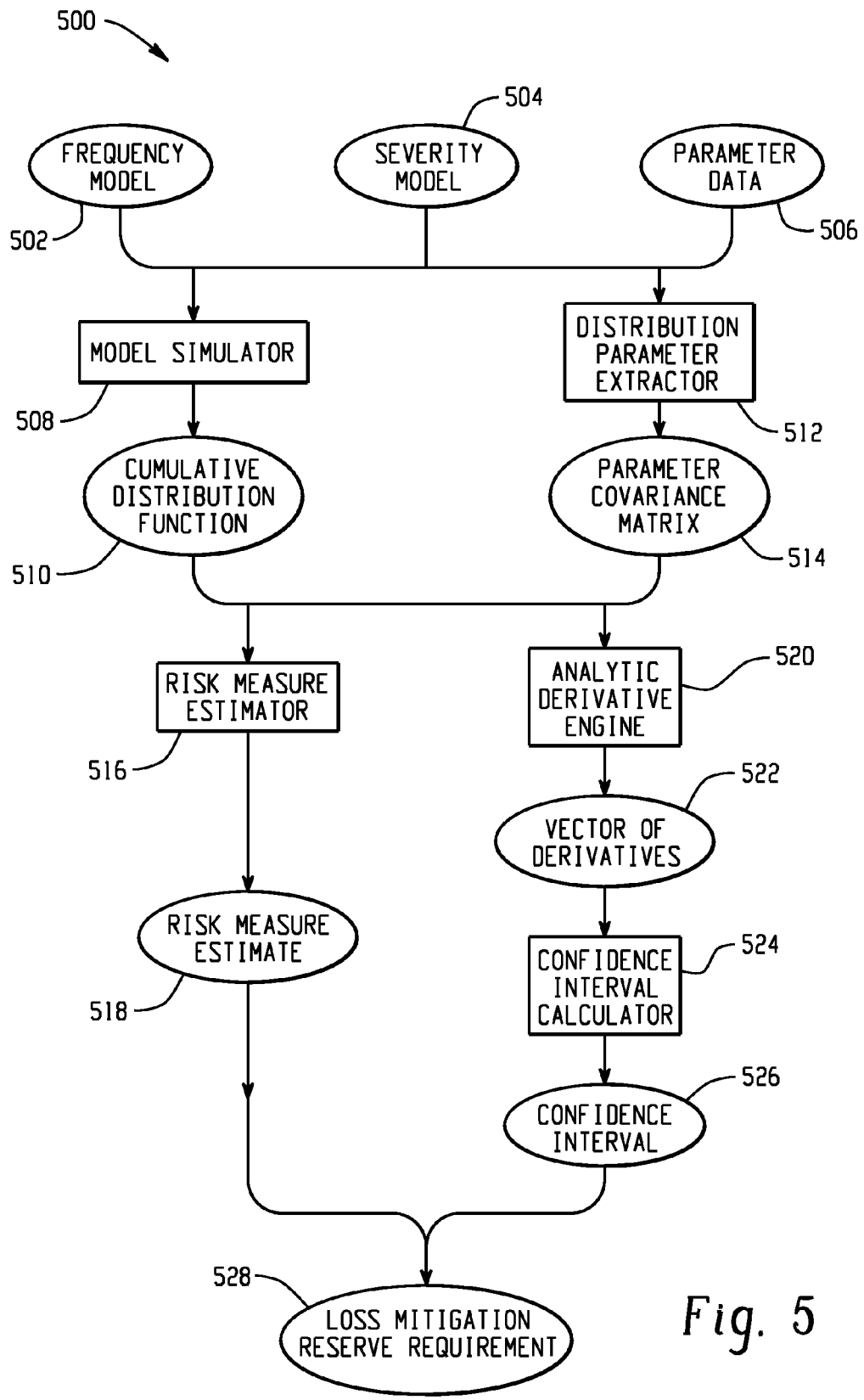
FIG. 5 is a flow diagram depicting inputs, processing, and outputs of a risk estimate controller.

FIG. 5 is a flow diagram depicting inputs, processing, and outputs of a risk estimate controller. The risk estimate controller receives a frequency model 502 for identifying a number of losses for each estimated aggregate loss, a severity model 504 for applying a magnitude to each identified loss, and parameter data 506 for configuring the frequency model 502 and the severity model 504. These inputs are received by a model simulator 508 that generates a number of estimated aggregate losses to generate a cumulative distribution 510. For example, the model simulator 508 may identify a number of predicted losses based on a configured frequency model and a loss magnitude for each of those losses based on a configured severity model. The sum of those loss magnitudes is retained as an estimated aggregate loss. A set of several estimated aggregate losses may be viewed in the form of a cumulative distribution function 510.

The risk estimate controller also identifies characteristics of the parameter data 506 to aid in calculation of a confidence interval for a calculated value at risk measurement. Parameters for the severity and frequency models (distributions) are estimated and stored by a distribution parameter extractor 512 as parameter covariance matrices 514. The cumulative distribution function 510 and the parameter covariance matrix 514 may be utilized by a risk measure estimator 516 to generate a risk measure estimate 518. For example, to identify at 99% value at risk measure, the risk measure estimator 516 may evaluate the cumulative distribution function 510 at the 99$^{th}$ percentile.

An analytic derivative engine 520 generates a vector of derivatives 522 based on the parameter covariance matrices 514. Because the sensitivity of a risk measure to the severity parameters is often a larger contribution to the confidence intervals (e.g., sometimes an order of magnitude larger than the sensitivity of the risk measure to frequency parameters), analytic derivatives are utilized for the sensitivities to the severity parameters to ensure accuracy. Analytic derivatives or numerical approximations may be utilized in calculating the sensitivities of the risk measure to the frequency parameters. Higher order derivatives may also be computed to improve the accuracy of the confidence intervals. Based on the calculated vectors of derivatives 522, a confidence interval calculator 524 calculates a confidence interval 526 for the risk measure estimate 518. The risk estimate controller may then output the loss mitigation reserve requirement as the sum of the risk measure estimate plus the one-side width of the confidence interval (e.g., the loss mitigation reserve requirement for a risk measure estimate of $1 million with a confidence interval of ±$100 thousand would be $1.1 million).

Figure 6:
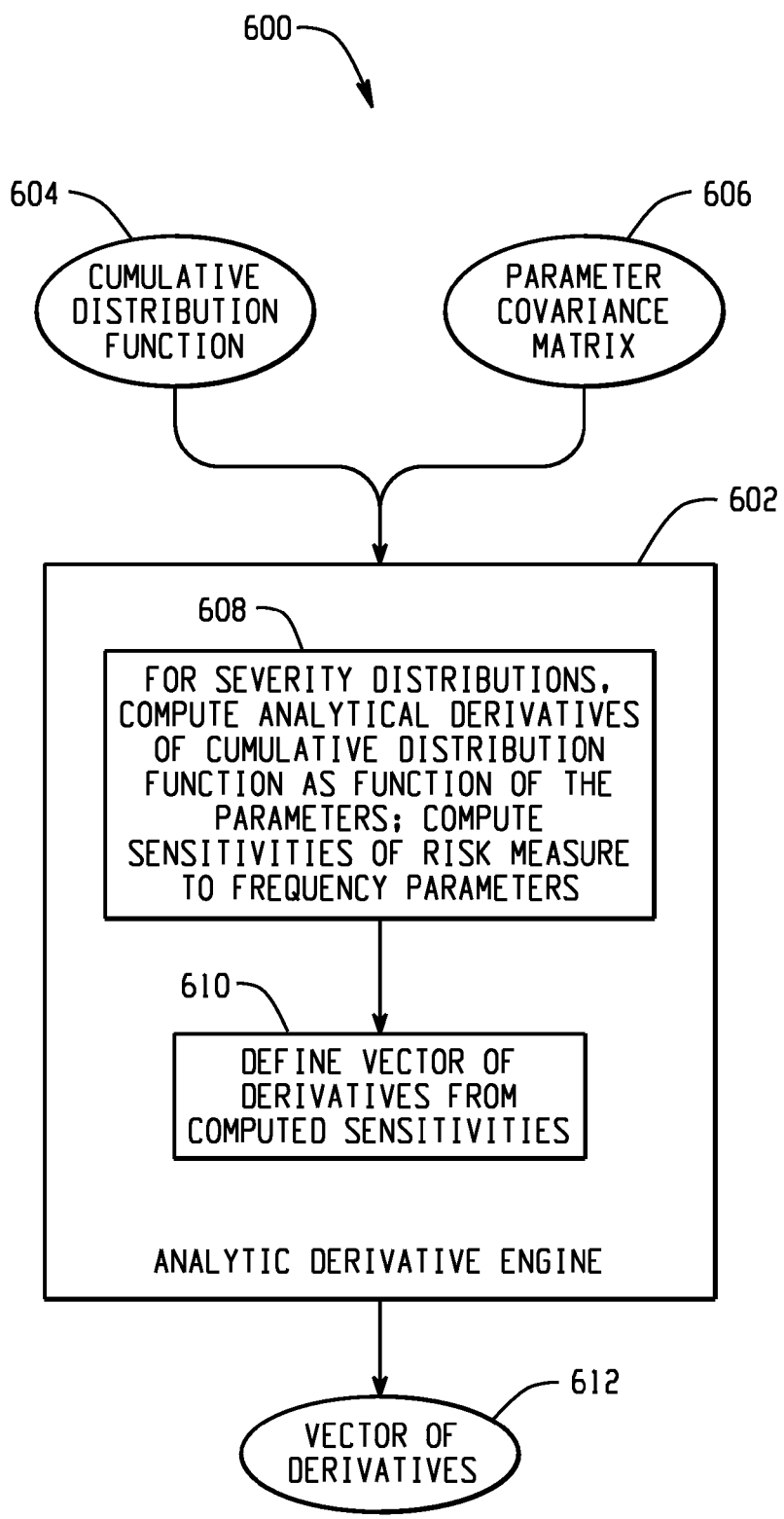
FIG. 6 is a block diagram depicting an example analytic derivative engine configuration.

FIG. 6 is a block diagram depicting an example analytic derivative engine configuration. The analytic derivative engine 602 receives the cumulative distribution function 604 and parameter covariance matrix 606. The analytical derivative engine computes analytical derivatives of the cumulative distribution function as a function of the parameters, as shown at 608. Because the risk measure may be somewhat less sensitive to the frequency parameters, the sensitivities to the frequency parameters may be calculated at 608 analytically or via an approximation for a possible savings in computation time. A vector of derivatives is then defined at 610 based on the computed sensitivities, and the vector of derivatives is output 612. The vector of derivatives 612 may then be utilized to calculate the desired confidence interval, as shown in FIG. 5 at 524, 526 and discussed further herein.

The process is described in mathematical detail herein below. Under the loss distribution approach to risk management, it is assumed that the aggregate loss, S, over some period can be modeled as $$S = \sum_{i=1}^{N} X_i,$$

where the $X_i$ are assumed to be random variables modeling the severity of individual loss events and N is assumed to be a non-negative, integer valued random variable which models the frequency of such events. As described above, companies are interested in determining their value at risk, which is a loss amount R* such that the probability of exceeding R* is $\alpha$, which is usually small (e.g., 0.01) so that R* lies in the tail of the distribution of S. It is assumed that parametric forms are used so that the $X_i$ have a cumulative distribution function $F_X(\bullet|\beta_X)$ an N has a mass function $f_N(\bullet|\beta_N)$.

As discussed with respect to FIG. 5, parameters regarding the frequency and severity distributions are estimated, and the estimation process generates a parameter covariance matrix. Assuming that the parameter estimation method yields estimates that are asymptotically normal and unbiased, the parameters may be estimated using the maximum likelihood method. Thus, $$[\hat{\beta}_X,\hat{\beta}_N]^T \sim N([\beta_X,\beta_N]^T,\Sigma).$$

The error $\beta_E$ in estimating $\beta=[\hat{\beta}_X,\hat{\beta}_N]^T$ is then assumed to be distributed normally with mean zero and covariance matrix $\Sigma$. To map parameter confidence intervals into confidence intervals for R*, a delta normal approach may be implemented, with the severity distribution discretized so that the aggregate distribution may be computed using a method such as Panjer recursion.

For fixed severity and frequency distributions, the VaR risk measure is completely determined by $\beta_X$ and $\beta_N$. Thus, to map changes in the model parameters into changes in VaR, a function $R(\beta_X, \beta_N)$ is sought such that $F_S(R(\beta_X,\beta_N)|\beta_X,\beta_N)=(1\alpha)$, where $F_S$ is the cumulative distribution function of S. Such a function would enable obtainment of the confidence interval about a VaR estimate associated with parameter uncertainty by simulating from the known limiting parameter distribution and mapping into the corresponding VaR via the function $R(\bullet)$. However, a closed form of $R(\bullet)$ is generally not available. One of the difficulties stems from the lack of a closed form expression for $F_S$. Further difficulty lies in the invertibility of $F_S$. The 99.9% VaR is $F_S^{-1}(0.999)$. Thus, to generate a closed form expression for $R(\bullet)$, not only is an expression for $F_S$ needed, but a way to invert $F_S$ is also required. Because $F_S$ is generally an infinite sum, this is rarely possible.

Because the way the VaR risk measure changes in response to changes in parameters is sought, the derivatives of the function $R(\bullet)$ are of interest. The derivative of $R(\bullet)$ may be used to approximate its behavior in a region near the parameter estimates.

Given a formulation for $F_S$, how the VaR risk measure changes in response to parameter changes may be examined. $F_S$ may be viewed as a function of the severity and frequency parameters:

$$P(S \leq s) = F_S(s,\beta_X,\beta_N).$$

Substituting the VaR, R*, for s and using the estimated parameter values gives:

$$F_S(R^*,\hat{\beta}_X,\hat{\beta}_N)=(1-\alpha).$$

By fixing $\alpha$ at a value, the implicit function theorem provides for the existence of the function $R(\beta_X, \beta_N)$ so that $F_S(R(\beta_X,\beta_N), \beta_X, \beta_N)=(1-\alpha)$ in a neighborhood about $[\hat{\beta}_X,\hat{\beta}_N]^T$. Further, $$\frac{\partial}{\partial \beta_i}F_S(R(\beta_X,\beta_N), \beta_X, \beta_N) = \frac{\partial}{\partial \beta_i}(1-\alpha) = 0 \; \forall \; \beta_i \in \{\beta_X, \beta_N\},$$

which implies that $$\frac{\partial R(\beta_X, \beta_N)}{\partial \beta_i} = -\frac{1}{\frac{\partial F_S(R, \beta)}{\partial R}} \cdot \frac{\partial F_S(R, \beta)}{\partial \beta_i}.$$

While the explicit functional form of $R(\beta_X, \beta_N)$ is unknown, its derivatives at the estimated parameters may be obtained by looking at $F_S$. It is clear from the above formula that the derivatives of $R(\bullet)$ of any order can be expressed entirely in terms of derivatives of $F_S$. As along $F_X$ and $F_N$ are sufficiently smooth, $R(\bullet)$ will be a smooth function. Thus, these derivatives will be well defined. This allows acquisition of local approximations of the behavior of $R(\bullet)$ by looking at its Taylor expression, provided derivatives of $F_S$ can be computed.

Panjer's recursion may be utilized to formulate $F_S$ for easy calculation of its derivatives. From the definition of aggregate loss described above, $F_S$ may be expressed as shown below using convolutions:

$$F_S(S) = P(S \leq s) = \sum_{i=0}^{\infty} P(N = i) \cdot P\left(\left(\sum_{j=1}^{i} X_j\right) \leq s\right) = \sum_{i=0}^{\infty} f_N(i) \cdot F_X^{*i}(s)$$

where $$F_X^{*i}(s) = \int_0^s F_X^{*(i-1)}(s - u) \, dF_X(u).$$

If the distribution of the $X_i$ is discrete, $F_S(s)$ may be evaluated recursively. Since X is generally drawn from a continuous distribution, a discrete approximation to X may first be computed. The discretization may be done over a lattice of width h, where h>0. Let $X_h$ denote the discretized representation of X, with $f_k=P(X_h=h \cdot k)$. Let $g_k=P(S=h \cdot k)$ and let $p_k=P(N=k)$. Because N belongs to the (a,b,0) class, it satisfies:

$$P(N = k) = p_k = \left(a + \frac{b}{k}\right) \cdot p_{k-1}, k \geq 1,$$

where a and b are constants determined by the distribution of N. The following recursion follows:

$$g_k = \left(\frac{1}{1 - af_0}\right)\sum_{j=1}^{k}\left(a + \frac{bj}{k}\right)f_j \cdot g_{k-j}$$

$$g_0 = e^{-b(1-f_0)} \quad a = 0$$

$$g_0 = \left[\frac{1 - af_0}{1 - a}\right]^{-\frac{a+b}{a}} \quad a \neq 0.$$

The discrete approximation can then be calculated. Because calculations are being made with a discretization of S, $$\frac{\partial F_s(R, \beta)}{\partial R}$$

no longer exists. Thus, the following approximation is utilized:

$$\left.\frac{\partial F_S(R, \beta)}{\partial R}\right|_{R^*} \approx \frac{F_S\left(r^*h + \frac{h}{2}\right)}{h} = g_{r^*} \cdot \frac{1}{h},$$

where r* is an integer chosen so that r*·h≈R*. To approximate $$\frac{\partial F_s(R, \beta)}{\partial R},$$

it is noted that:

$$F_S(R, \beta)\big|_{R^*} \approx \sum_{i=0}^{r^*} g_i$$

and so $$\frac{\partial F_S(R, \beta)}{\partial \beta_i} \approx \sum_{j=0}^{r^*} \frac{\partial g_j}{\partial \beta_i}.$$

The discrete approximation can then be evaluated as:

$$\frac{\partial R(\beta_X, \beta_N)}{\partial \beta_i} \approx -\frac{h}{g_{r^*}} \cdot \left[\sum_{j=0}^{r^*} \frac{\partial g_j}{\partial \beta_i}\right].$$

Using the above formula, the gradient:

$$d = \left[\frac{\partial R}{\partial \beta_X}, \frac{\partial R}{\partial \beta_N}\right]^T$$

may be formed. The first order approximation to R(•) at $\hat{\beta} = [\hat{\beta}_X, \hat{\beta}_N]^T$ is:

$$R(\beta) - R^* \approx d^T(\beta - \hat{\beta}).$$

Thus, the first order approximation to R(•) is normally distributed with mean R* and covariance matrix $d^T \Sigma d$. So, for example, a 95% confidence interval can be computed as $R^* \pm 1.96 \cdot \sqrt{d^T \Sigma d}$.

Key risk indicators (KRIs) may be used to incorporate knowledge about the state of affairs in various parts of an organization into the modeling process. For example, employee turnover records and customer complaints are common risk factors that can play an important role in determining the losses experienced in a given period. The effect of KRIs on the VaR risk measure is often of interest. Determining how the VaR risk measure is affected by KRIs may help determine where resources should be spent to most effectively reduce losses from operational events and can be addressed with the methodology described above. Also, confidence intervals about a VaR value that incorporate the uncertainty in estimates of the effect of KRIs on losses can be computed.

As an example, consider the severity. X, is modeled so that it has a scale parameter, θ (i.e., $F_X(\bullet|\theta) = \theta F_x(\bullet|1)$). The set of KRIs is $K = k_1, k_2, \ldots, k_n$, where $k_i$ may be a measure of turnover, employee sick days, etc. Assuming that the KRIs effect the severity of losses by directly acting on the scale parameter:

$$\theta = e^{b_0 + \Sigma b_i k_i} \Rightarrow \log(\theta) = b_0 + \sum_{i=1}^n b_i \cdot k_i,$$

where the $b_i$ are coefficients that must be determined by a statistical process. The first order effect of a change in the KRIs on VaR follows directly from the chain rule and the evaluation of the above described discrete approximation:

$$\frac{\partial R^*}{\partial k_i} = \frac{\partial R^*}{\partial \theta} \frac{\partial \theta}{\partial k_i} = -\frac{h}{g_{r^*}} \cdot \sum_{j=0}^{r^*} \frac{\partial g_j}{\partial \beta_i} \cdot b_i \cdot \theta.$$

Thus, if $k_i$ can be changed at a per unit cost of $p_i$, a cost effective approach to reducing VaR would be to first invest in changing $k_j$, where $$j = \operatorname*{argmax}_i \left(p_i \cdot \frac{\partial R^*}{\partial k_i}\right).$$

The confidence interval may be approximated using the same method as described above, where the derivatives used to construct the gradient d are taken from the definition of $$\frac{\partial R^*}{\partial k_i}$$

immediately above.

A second order approximation to the confidence intervals is more computationally expensive. In order to compute $$\frac{\partial^2 F_S(R, \beta)}{\partial \beta_i \partial \beta_j}, \frac{\partial R(B_X, \beta_N)}{\partial \beta_i},$$

described above, may be differentiated with respect to $\beta_j$:

$$\frac{\partial^2 R}{\partial \beta_i \partial \beta_j} \approx \left(\frac{\partial F_S}{\partial R}\right)^{-2} \cdot \frac{\partial^2 F_S}{\partial R \partial \beta_j} \cdot \frac{\partial F_S}{\partial \beta_i} - \left(\frac{\partial F_S}{\partial R}\right)^{-1} \cdot \frac{\partial^2 F_S}{\partial \beta_i \partial \beta_j},$$

where $$\frac{\partial^2 F_S}{\partial R \partial \beta_j} \approx \frac{\partial g_{r^*}}{\partial R} \cdot \frac{1}{h}$$

and $$\frac{\partial^2 F_S}{\partial \beta_i \partial \beta_j} \approx \sum_{k=0}^{r^*} \frac{\partial^2 g_k}{\partial \beta_i \partial \beta_j}.$$

The second order expansion of R(•) about $\hat{\beta}$ is:

$$R(\beta) - R^* \approx d^T \beta_E + \frac{1}{2}\beta_E^T H_R \beta_E,$$

where $H_R$ is the Hessian matrix. Because $\beta_E$ is normally distributed, the term $\beta_E^T H_R \beta_E$ will follow a gamma distribution. However, the distribution is of $R(\beta)-R^*$ is unknown. Thus, simulation may be used to produce confidence intervals.

Figure 7:
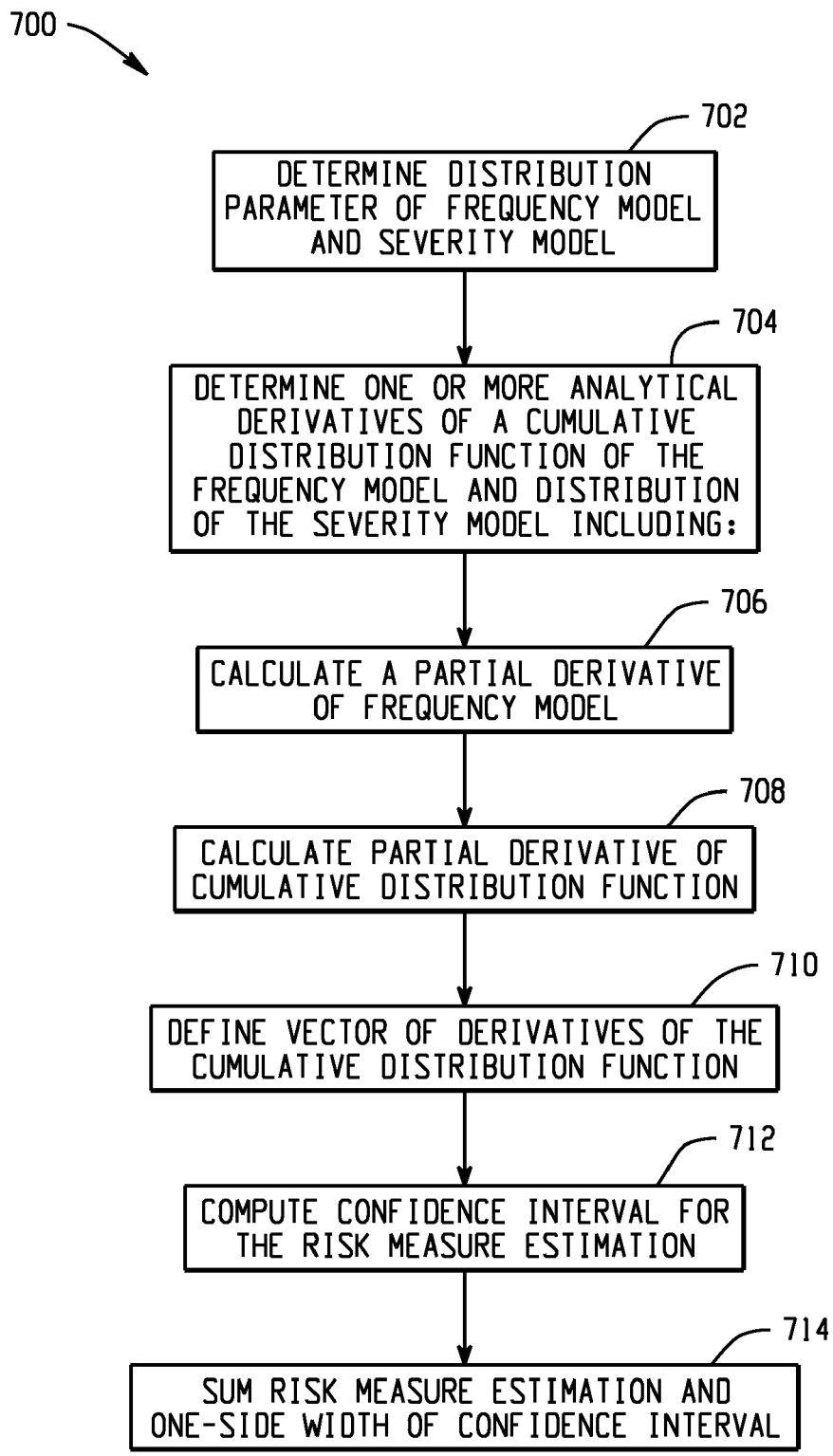
FIG. 7 is a flow diagram depicting a computer-implemented method for determining a loss mitigation reserve requirement based on a risk measure estimation and a confidence interval associated with the risk measure estimation.

FIG. 7 is a flow diagram depicting a computer-implemented method for determining a loss mitigation reserve requirement based on a risk measure estimation and a confidence interval associated with the risk measure estimation, where the risk measure estimation is based on a number of predicted losses estimated by a frequency model and a severity of each predicted loss estimated by a severity model. A determination of a distribution parameter of the frequency model and a distribution parameter of the severity model is made at 702 and a covariance matrix representing the determined parameter of the distribution of the frequency model and the determined parameter of the distribution of the severity model is generated. One or more analytical derivatives of the cumulative distribution function of the distribution of the frequency model and the distribution of the severity model are determined using the covariance matrix at 704. The determining one or more analytical derivatives includes calculating a partial derivative of the frequency model with respect to one of the parameters of the distribution of the frequency model at 706, calculating a partial derivative of the frequency model with respect to one of the parameters of the distribution of the frequency model at 708, and defining a vector of derivatives of the cumulative distribution function with respect to one or more parameters of the distribution of the frequency model and one or more parameters of the distribution of the severity model at 710. A confidence interval for the risk measure estimation is computed at 712 based on the vector of derivatives of the cumulative distribution function. The risk measure estimation and a one-side width of the confidence interval are summed at 714 as the loss mitigation reserve requirement value, and the loss mitigation reserve requirement value may be stored in a computer-readable medium.

Figure 8A:
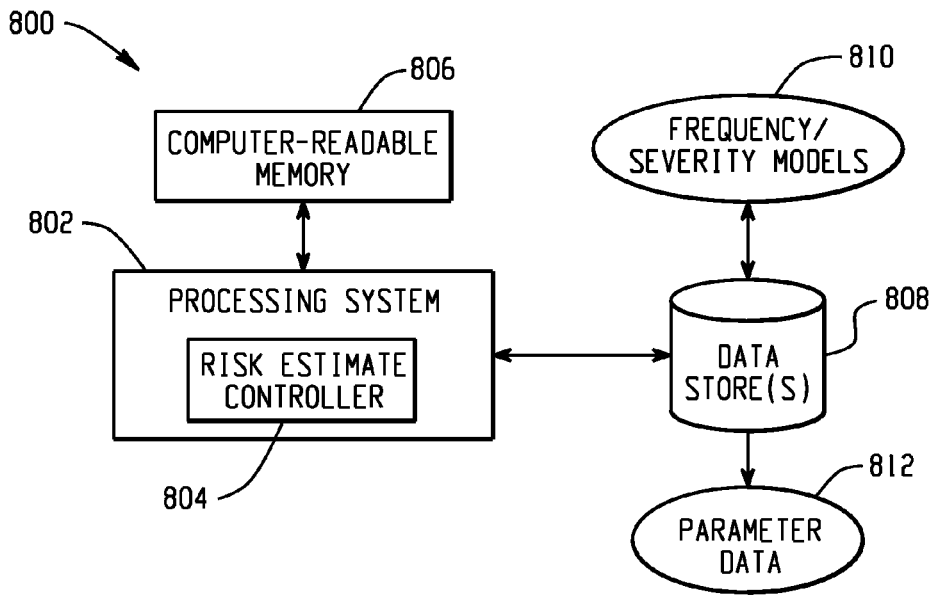
FIGS. 8A, 8B, and 8C depict example processing systems for use in implementing a risk estimate controller.
Figure 8B:
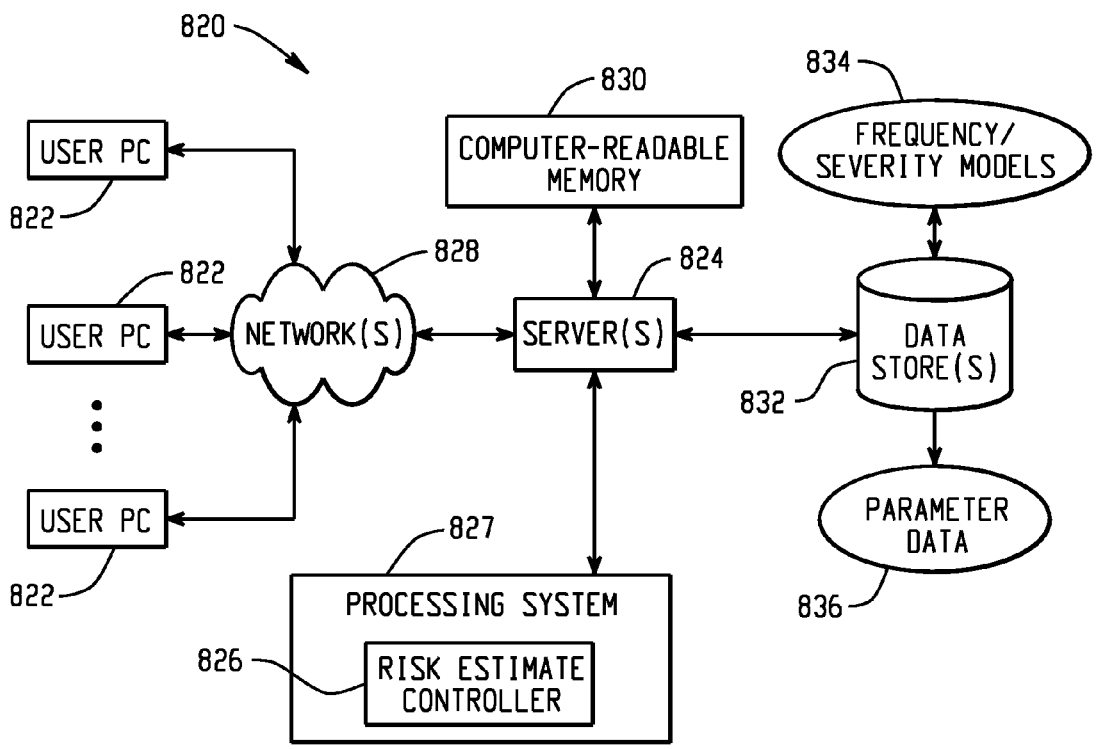
Figure 8C:
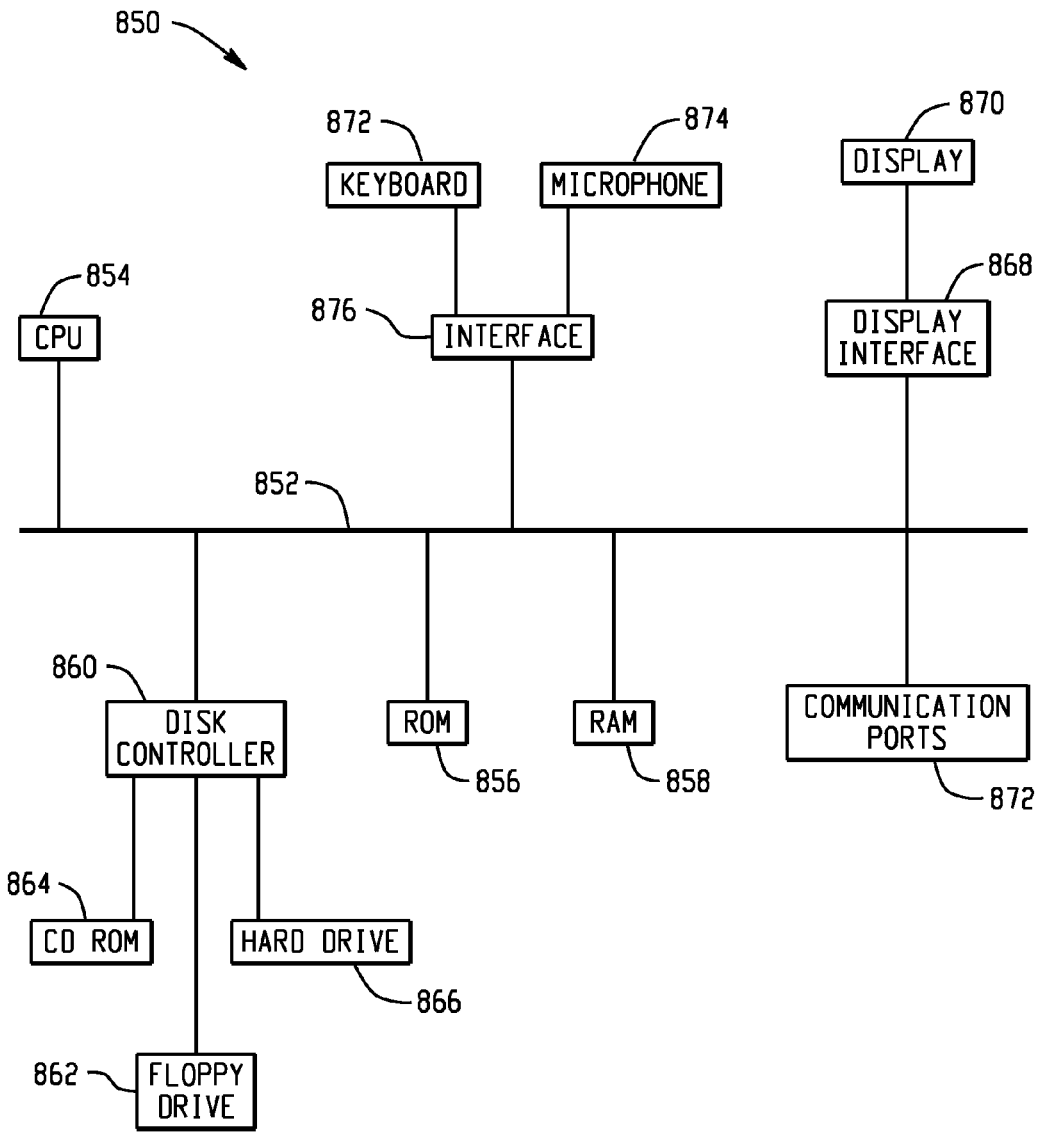

FIGS. 8A, 8B, and 8C depict example systems for use in implementing a risk estimate controller. For example, FIG. 8A depicts an exemplary system 800 that includes a stand alone computer architecture where a processing system 802 (e.g., one or more computer processors) includes a risk estimate controller 804 being executed on it. The processing system 802 has access to a computer-readable memory 806 in addition to one or more data stores 808. The one or more data stores 808 may contain frequency/severity models 810 as well as parameter data 812.

FIG. 8B depicts a system 820 that includes a client server architecture. One or more user PCs 822 accesses one or more servers 824 running a risk estimate controller 826 on a processing system 827 via one or more networks 828. The one or more servers 824 may access a computer readable memory 830 as well as one or more data stores 832. The one or more data stores 832 may contain frequency/severity models 834 as well as parameter data 836.

FIG. 8C shows a block diagram of exemplary hardware for a stand alone computer architecture 850, such as the architecture depicted in FIG. 8A, that may be used to contain and/or implement the program instructions of system embodiments of the present invention. A bus 852 may serve as the information highway interconnecting the other illustrated components of the hardware. A processing system 854 labeled CPU (central processing unit) (e.g., one or more computer processors), may perform calculations and logic operations required to execute a program. A processor-readable storage medium, such as read only memory (ROM) 856 and random access memory (RAM) 858, may be in communication with the processing system 854 and may contain one or more programming instructions for performing the method of implementing a risk estimate controller. Optionally, program instructions may be stored on a computer readable storage medium such as a magnetic disk, optical disk, recordable memory device, flash memory, or other physical storage medium. Computer instructions may also be communicated via a communications signal, or a modulated carrier wave.

A disk controller 860 interfaces one or more optional disk drives to the system bus 852. These disk drives may be external or internal floppy disk drives such as 862, external or internal CD-ROM, CD-R, CD-RW or DVD drives such as 864, or external or internal hard drives 866. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 860, the ROM 856 and/or the RAM 858. Preferably, the processor 854 may access each component as required.

A display interface 868 may permit information from the bus 856 to be displayed on a display 870 in audio, graphic, or alphanumeric format. Communication with external devices may optionally occur using various communication ports 872.

In addition to the standard computer-type components, the hardware may also include data input devices, such as a keyboard 872, or other input device 874, such as a microphone, remote control, pointer, mouse and/or joystick.

This written description uses examples to disclose the invention, including the best mode, and also to enable a person skilled in the art to make and use the invention. The patentable scope of the invention may include other examples. For example, the systems and methods may include data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented method, comprising:
   receiving a frequency model that identifies a number of losses;
   receiving a severity model that applies a magnitude to each identified loss;
   receiving loss data for fitting the frequency model and the severity model;
   fitting the frequency model and the severity model using the loss data;
   generating, by one or more processors using a model simulator, a cumulative distribution including a set of aggregate losses, wherein the model simulator identifies a number of losses using the fitted frequency model and applies a loss magnitude to each identified loss using the fitted severity model, wherein a sum of the loss magnitudes is an aggregate loss;
   generating, by the one or more processors, one or more parameter covariance matrices using the fitted frequency model and the fitted severity model;
   generating, by the one or more processors, a risk measure estimate using the cumulative distribution and the one or more parameter covariance matrices;
   generating, by the one or more processors, one or more vectors of derivatives using the one or more parameter covariance matrices;
   calculating, by the one or more processors, a confidence interval for the risk measure estimate using the one or more vectors of derivatives; and
   generating, by the one or more processors, a loss mitigation reserve by summing the risk measure estimate and a one-side width of the confidence interval.

2. The method of claim 1, wherein using the loss data to fit the frequency model and the severity model includes determining a distribution parameter of the frequency model and a distribution parameter of the severity model.

3. The method of claim 2, further comprising:
   determining the distribution parameter using a maximum likelihood method.

4. The method of claim 2, wherein the one or more parameter covariance matrices represent a variance and a covariance of the determined distribution parameter.

5. The method of claim 2, further comprising:
   determining one or more analytical derivatives by calculating a partial derivative of the frequency model according to the distribution parameter of the frequency model.

6. The method of claim 5, further comprising:
   calculating the partial derivative using a Panjer algorithm.

7. The method of claim 5, further comprising:
   calculating the partial derivative using a fast-Fourier transform.

8. The method of claim 1, further comprising:
   generating the cumulative distribution using a Monte Carlo simulation.

9. The method of claim 1, wherein the frequency model belongs to a Panjer class of frequency models.

10. The method of claim 1, wherein the severity model follows at least one of a log-normal distribution, an exponential distribution, or a Burr distribution.

11. A computer-implemented system, comprising:
    one or more processors;
    one or more non-transitory computer-readable storage mediums containing instructions configured to cause the one or more processors to perform operations including:
       receiving a frequency model that identifies a number of losses;
       receiving a severity model that applies a magnitude to each identified loss;
       receiving loss data for fitting the frequency model and the severity model;
       fitting the frequency model and the severity model using the loss data;
       generating, using a model simulator, a cumulative distribution including a set of aggregate losses, wherein the model simulator identifies a number of losses using the fitted frequency model and applies a loss magnitude to each identified loss using the fitted severity model, wherein a sum of the loss magnitudes is an aggregate loss;
       generating one or more parameter covariance matrices using the fitted frequency model and the fitted severity model;
       generating a risk measure estimate using the cumulative distribution and the one or more parameter covariance matrices;
       generating one or more vectors of derivatives using the one or more parameter covariance matrices;
       calculating a confidence interval for the risk measure estimate using the one or more vectors of derivatives; and
       generating a loss mitigation reserve by summing the risk measure estimate and a one-side width of the confidence interval.

12. The system of claim 11, wherein using the loss data to fit the frequency model and the severity model includes determining a distribution parameter of the frequency model and a distribution parameter of the severity model.

13. The system of claim 12, wherein the distribution parameter is determined using a maximum likelihood method.

14. The system of claim 12, wherein the one or more parameter covariance matrices represent a variance and a covariance of the determined distribution parameter.

15. The system of claim 12, further comprising instructions configured to cause the one or more processors to perform operations including:
    determining one or more analytical derivatives by calculating a partial derivative of the frequency model according to the distribution parameter of the frequency model.

16. The system of claim 15, wherein the partial derivative is calculated using a Panjer algorithm.

17. The system of claim 15, wherein the partial derivative is calculated using a fast-Fourier transform.

18. The system of claim 11, wherein the cumulative distribution is generated using a Monte Carlo simulation.

19. The system of claim 11, wherein the frequency model belongs to a Panjer class of frequency models.

20. The system of claim 11, wherein the severity model follows at least one of a log-normal distribution, an exponential distribution, or a Burr distribution.

21. A computer-program product, tangibly embodied in a machine-readable non-transitory storage medium, including instructions configured to cause a data processing apparatus to:
    receive a frequency model that identifies a number of losses;
    receive a severity model that applies a magnitude to each identified loss;
    receive loss data for fitting the frequency model and the severity model;
    fit the frequency model and the severity model using the loss data;
    generating, using a model simulator, a cumulative distribution including a set of aggregate losses, wherein the model simulator identifies a number of losses using the fitted frequency model and applies a loss magnitude to each identified loss using the fitted severity model, wherein a sum of the loss magnitudes is an aggregate loss;
    generate one or more parameter covariance matrices using the fitted frequency model and the fitted severity model;
    generate a risk measure estimate using the cumulative distribution and the one or more parameter covariance matrices;
    generate one or more vectors of derivatives using the one or more parameter covariance matrices;
    calculate a confidence interval for the risk measure estimate using the one or more vectors of derivatives; and
    generate a loss mitigation reserve by summing the risk measure estimate and a one-side width of the confidence interval.

22. The computer-program product of claim 21, wherein using the loss data to fit the frequency model and the severity model includes instructions for determining a distribution parameter of the frequency model and a distribution parameter of the severity model.

23. The computer-program product of claim 22, including instructions configured to cause a data processing apparatus to determine the distribution parameter using a maximum likelihood method.

24. The computer-program product of claim 22, wherein the one or more parameter covariance matrices represent a variance and a covariance of the determined distribution parameter.

25. The computer-program product of claim 22, further comprising instructions configured to cause the data processing apparatus to:
    determine one or more analytical derivatives by calculating a partial derivative of the frequency model according to the distribution parameter of the frequency model.

26. The computer-program product of claim 25, further including instructions configured to cause a data processing apparatus to calculate the partial derivative using a Panjer algorithm.

27. The computer-program product of claim 25, further including instructions configured to cause a data processing apparatus to calculate the partial derivative using a fast-Fourier transform.

28. The computer-program product of claim 21, including instructions configured to cause a data processing apparatus to generate the cumulative distribution using a Monte Carlo simulation.

29. The computer-program product of claim 21, wherein the frequency model belongs to a Panjer class of frequency models.

30. The computer-program product of claim 21, wherein the severity model follows at least one of a log-normal distribution, an exponential distribution, or a Burr distribution.

* * * * *